May 12, 1942. E. E. WEMP 2,283,112
CLUTCH DISK
Filed Jan. 7, 1939
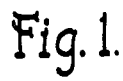
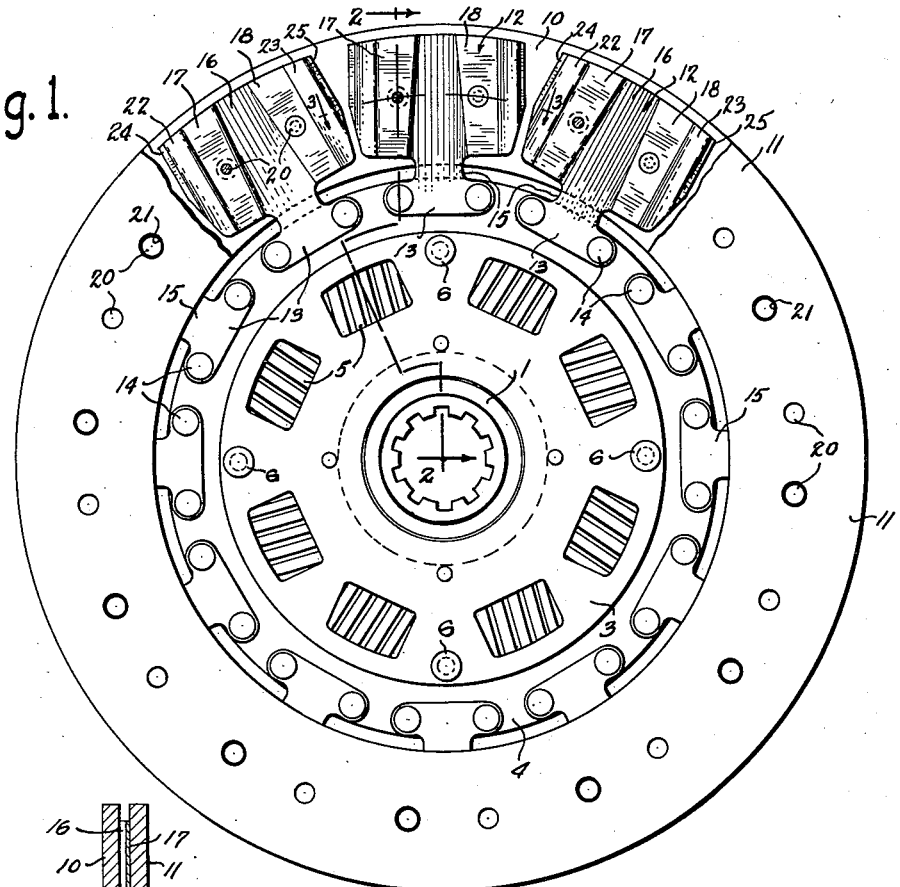
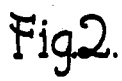
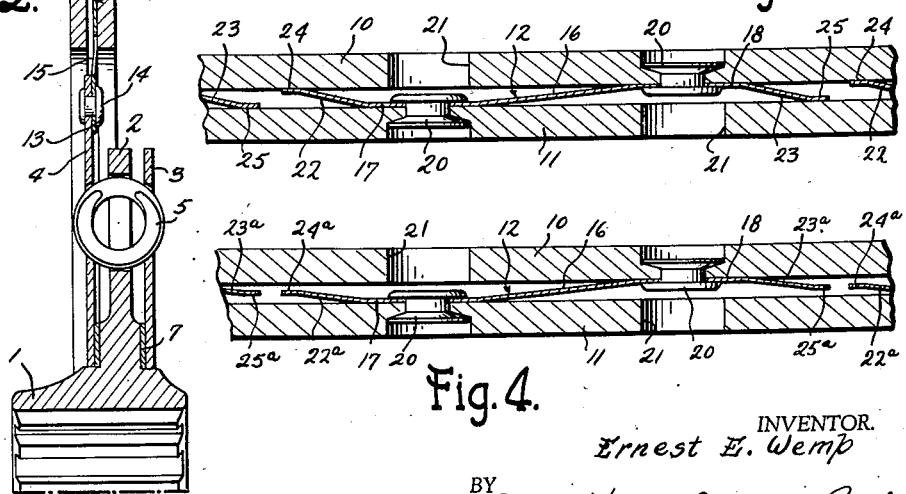
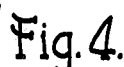
INVENTOR.
Ernest E. Wemp
BY Barnes, Kisselle, Laughlin & Raisch
ATTORNEYS Patented May 12, 1942

2,283,112

UNITED STATES PATENT OFFICE 2,283,112

CLUTCH DISK

Ernest E. Wemp, Detroit, Mich.

Application January 7, 1939, Serial No. 249,697

4 Claims. (Cl. 192—107)

This invention relates to a clutch disk of the cushion type adapted to be packed between clutch driving members. In an automotive vehicle, for example, a disk of this type is ordinarily attached to a driven shaft and the disk is engaged with pressure between the engine flywheel and an axially shiftable pressure plate mounted to rotate with the flywheel, the flywheel and pressure plate constituting driving members.

In accordance with this invention structurally separate spring metal cushion members are mounted upon a body which may be in the form of a disk, and the cushion members serve to hold oppositely positioned facing rings yieldably separated. A feature of the invention is an arrangement wherein an increased number of points of yieldable support is afforded for each facing; that is to say the number is increased over cushion arrangements in the prior art which will be hereinafter referred to, with the result that the greater number of points of support, or rather locations of support, decreases the unit pressure at localized points on the facing during clutch engagement, and this decreases the tendency for the clutch to chatter or grab.

These and other features and objects will be better understood as the detailed description progresses.

In the drawing:

Fig. 1 is an elevational view of a clutch disk constructed in accordance with the invention with part of one facing cut away to show the underlying cushion member.

Fig. 2 is a cross sectional view taken substantially on line 2—2 of Fig. 1.

Fig. 3 is an enlarged sectional view substantially on line 3—3 of Fig. 1.

Fig. 4 is an enlarged sectional view similar to Fig. 3 showing a modified arrangement.

In the structure illustrated the driven member has a hub 1 arranged to be splined to a driven shaft. The hub has a flange 2 on one side of which is a washer member 3 and on the other side of which is a disk 4. The flange, washer and disk have aligned apertures in which coil springs 5 are located. This forms a cushioning or vibration dampening drive between the disk and the hub. The disk and washer are secured together to move in unison through the means of rivets 6, the rivets passing through clearance slots (not shown) in the flange 2. Friction material 7 may be disposed between the flange and the washer and the disk. The structure thus far described may correspond substantially to my Patent No. 2,042,570 and need not be further described. Such a vibration dampener construction may or may not be used with the cushion structure about to be described.

As will be noted, the disk 4 terminates radially inwardly of two friction facing rings 10 and 11, while structurally separate cushion members 12 are disposed between the facings. These cushion members are preferably of relatively light gauge spring steel stock, that is, relatively light as compared to the disk.

Each cushion member has a foot or base portion 13 for attachment to the disk as by means of rivets 14, and has a circumferentially enlarged head portion preformed so as to normally and yieldably hold the facings axially separated. Between the base portion 13 and the enlarged head each cushion member, as shown in Fig. 1, is formed to provide a narrowed spoke-like connecting element 15. The head of each cushion member is shaped substantially as illustrated in Fig. 3. The central portion 16, which is substantially in radial alignment with the neck 15, is disposed angularly relative to the disk and the facings, or relative to the plane of rotation. The head is shaped to provide a land 17 on one side of the central portion and a land 18 on the other side thereof, these lands constituting high spots for contact with the facings and for connection to the facings by rivets 20 or the like. Each facing may be provided with clearance apertures 21 for clearing the heads of the rivets for attaching the opposite facing. The cushion members, as shown in Fig. 3, have portions 22 and 23 which extend angularly across the space between the facings, with the extreme end portions preferably flattened or fashioned as shown at 24 and 25 for contact as with one of the facings.

In the modified form shown in Fig. 4, the facings and rivets are the same and bear the same reference characters. However, the portions 22a and 23a do not extend entirely across the space between the facings, thus leaving the extreme end portions 24a and 25a normally free of one facing.

The function and operation of the disk is substantially as follows: In a normal unrestrained condition, the facings may be visualized as being held yieldably spaced substantially as shown in Fig. 3. When the facings are packed between driving members, the cushion members have a collapsing action and the facings are yieldably pressed toward each other. In this action the central portion 16 and the neck 15 are twisted torsionally as the forces tend to bring the angular portion 16 into a plane paralleling the facings. At the same time a bending action occurs; in this connection note that the facing 10 is supported by the land 18 which in turn gets its yielding support from the end 25 and the land 17. This structure resists collapsing action and the collapsing forces tend to bend and straighten out the formation. Now note that the facing 11 is supported by a similar structure extending from the end 24 to the land 18. And, of course, this resists the straightening out action.

This cushion structure is advantageous in that when the cushion members are located in an annular array on a given radius, an increased number of points or locations of support for the facings are provided. Each cushion member in the structure shown forms arch structures, one for supporting each facing, one extending from the end 25 to the land 17, and the other extending from the end 24 to the land 18. Thus the intermediate portion 16 is a common element which is advantageous. For example, in one structure which has been manufactured, the cushion member had a circumferential dimension of about 2 inches and the distance between the points of facing support was about 1½ inches. As a matter of comparison this may be considered with the structure shown in my Patent No. 2,117,527 of May 17, 1938. A manufactured structure in accordance with this patent had a cushion member of about $3\frac{1}{16}$ inches in circumferential dimension, with the distance between the points of support of about 1½ inches, and a center relatively inert land of $\frac{1}{16}$ of an inch for attachment purposes.

A greater number of cushion members of the type shown herein may be disposed in an annular array on a given radius, and this provides an increased number of points or locations of support for the facings. These points or locations yieldably resist compression action during clutch engagement, and as a result there is an increased area on the facings which resists compression and a correspondingly decreased unit pressure. These things contribute to a smoothly acting clutch and decrease a tendency for the clutch to chatter or grab during clutch engagement.

Moreover, the distance between points of support may be of adequate length without decreasing the number of supporting points. It will be understood, of course, that where the distance between supporting points is short resistance to flexure is increased. As a result the stock of which the cushion member is made need not be so thin, and accordingly, the desired type and gauge of stock may be employed.

The same thing is true of the form shown in Fig. 4, except that some of the metal does not begin to function until the collapsing action brings the ends 24a and 25a into contact with the respective facings. The degree to which the portions 22 and 23 may traverse the spacing between the facings is variable.

In the claims appended hereto directed to this sort of structure, language is used which says that the ends of the beams are arranged to support the facings. This is intended to cover the structure where the ends are initially in contact with the facings and also where the ends come into contact with the facings only after some compression.

I claim:

1. A clutch driven member comprising two annular friction facing members adapted to be packed between clutch driving members, a body member with its outer peripheral edge disposed within the inner peripheral edges of the facing members, a plurality of structurally separate metal cushion members arranged in an annular array, each cushion member having an inner portion secured to the body member, a circumferentially enlarged outer portion lying between the facings, and twistable spoke-like intermediate connecting means of relatively small dimensions measured circumferentially, the enlarged outer portion being preformed on substantially radial bend lines to provide an angularly disposed central part with circumferentially and axially spaced lands for the facings on opposite sides of the central part to yieldingly space the facings, said lands extending substantially across the width of the facings, and means for securing the facings to the respective lands.

2. A clutch driven member comprising two annular friction facing members adapted to be packed between clutch driving members, a body member with its outer peripheral edge disposed within the inner peripheral edges of the facing members, a plurality of structurally separate metal cushion members arranged in an annular array, each cushion member having an inner portion secured to the body member, a circumferentially enlarged outer portion lying between the facings, and twistable spoke-like intermediate connecting means of relatively small dimensions measured circumferentially, the enlarged outer portion being preformed on substantially radial bend lines to provide an angularly disposed central part with circumferentially and axially spaced lands for the facings on opposite sides of the central part to yieldingly space the facings, said lands extending substantially across the width of the facings, the extreme ends of the enlarged portion extending angularly in a direction across the space between the facings, and means for securing the facings to the respective lands.

3. A clutch driven member comprising two annular friction facing members adapted to be packed between clutch driving members, a body member with its outer peripheral edge disposed within the inner peripheral edges of the facing members, a plurality of structurally separate metal cushion members arranged in an annular array, each cushion member having an inner portion secured to the body member and having its outer edge free, a circumferentially enlarged outer portion and a spoke-like portion connecting the inner and outer portions and substantially centrally disposed relative to the outer portion, the preformed outer portion having an intermediate part substantially in radial alignment with the spoke-like part and which is disposed angularly relative to the facings for spacing the facings and having lands for the respective facings on opposite sides of the intermediate portion and joining the intermediate portion substantially on radial bend lines, and having end portions extending in a direction diagonally of the space between the facings, said enlarged outer portion and its lands extending substantially across the width of the facings, and means securing the facings to the respective lands.

4. A clutch member comprising, a body member, a pair of annular friction facings disposed radially outwardly of the body member, a plurality of cushion members disposed in an annular array and having outer portions lying between and normally holding the facings yieldingly spaced apart axially, the outer portions having free outer edges, the outer portion of each cushion member comprising a sheet metal body fashioned into a yieldable formation having an intermediate portion extending angularly across the space between the two facings and having a land at opposite sides of the intermediate portion, each for engaging one of the facings, and end parts extending from the lands angularly crosswise of the space between the facings and each adapted to engage the facing toward which it extends, whereby each facing is supported by a land and one end portion of a cushion member, means for securing the facings to the lands, each cushion member having a single spoke-like element extending radially inwardly from the intermediate portion and connected to the body member, and each spoke-like member being arranged to be torsionally twisted as the outer portion is compressed.

ERNEST E. WEMP.